United States Patent Office 3,056,755
Patented Oct. 2, 1962

3,056,755
PROTECTIVE COATING COMPOSITIONS COMPRISING A TERNARY MIXTURE OF AN OIL-MODIFIED ALKYD RESIN AND AN ETHERIFIED FORMALDEHYDE RESIN
Harry M. Culbertson, Wilbraham, Mass., and Byron L. Williams, Jr., North Texas City, Tex., assignors to Monsanto Chemical Company, St. Louis, Mo., a corporation of Delaware
No Drawing. Filed Dec. 4, 1957, Ser. No. 700,537
11 Claims. (Cl. 260—21)

This invention relates to novel protective coating compositions. More particularly, the invention relates to protective coating compositions comprising an oil-modified alkyd resin, an etherified formaldehyde resin and (a) an N-substituted melamine of the group consisting of N,N'-dialkylmelamines, N,N',N''-trialkylmelamines and mixtures thereof, or (b) an unetherified formaldehyde condensate of such an N-substituted melamine.

Background of the Invention

Protective coating compositions containing blends of etherified melamine-formaldehyde resins and oil-modified alkyd resins have been widely used as baking enamels. Such protective coating compositions have the desirable characteristics of moderately rapid cure, good color retention and good chemical resistance. However, the etherified melamine-formaldehyde resins have limited compatibility with the oil-modified alkyd resins and impair the gloss of the ultimate coatings when used in substantial quantities to effect the maximum improvement in other film properties. The compatibility of etherified melamine-formaldehyde resins with oil-modified alkyd resins can be improved by modifying the etherified melamine-formaldehyde resins with other compounds such as arylsulfonamides. Such modification of the etherified melamine-formaldehyde resins, while improving the resins' compatibility with oil-modified alkyd resins, adversely affects other properties of the protective coating compositions, particularly the rate of cure. Thus, in preparing protective coating compositions containing an etherified melamine-formaldehyde resin, the art must choose between formulations having fast cures and low gloss or formulations having good gloss, but slow cures and low detergent resistance.

Accordingly, it is an object of this invention to provide protective coating compositions of improved properties.

Other objects and advantages of the invention will be apparent from the following detailed descriptions thereof.

Summary of the Invention

In accordance with this invention there are provided novel protective coating compositions which comprise an oil-modified alkyd resin, an etherified melamine-formaldehyde resin and (a) an N-substituted melamine of the group consisting of N,N'-dialkylmelamines, N,N',N''-trialkylmelamines and mixtures thereof or (b) an unetherified formaldehyde condensate of such an N-substituted melamine.

Experimental

The following examples are set forth to illustrate more clearly the principle and practice of this invention to those skilled in the art. Unless otherwise stated, where quantities are mentioned they are parts by weight.

EXAMPLE I

The following protective coating compositions are prepared in which the figures listed are parts by weight:

| Component | Coating Compositions | | | | | | | | | | | | |
|---|---|---|---|---|---|---|---|---|---|---|---|---|---|
|  | A | B | C | D | E | F | G | H | I | J | K | L | M |
| N,N'-dimethylmelamine | 1 |  |  |  |  |  |  |  |  |  |  |  | 1 |
| N,N',N''-trimethylmelamine |  | 2 |  |  |  |  |  |  |  |  |  |  |  |
| N,N'-di-n-butylmelamine |  |  | 1 |  |  |  |  |  |  |  |  |  |  |
| N,N',N''-tri-n-butylmelamine |  |  |  | 2 |  |  |  |  |  |  |  |  |  |
| N,N'-di-tert-butylmelamine |  |  |  |  | 1 |  |  |  |  |  |  |  |  |
| N,N',N''-tri-tert-butylmelamine |  |  |  |  |  | 2 |  |  |  |  |  |  |  |
| N,N'-di-sec-butylmelamine |  |  |  |  |  |  | 1 |  |  |  |  |  |  |
| N,N',N''-tri-sec-butylmelamine |  |  |  |  |  |  |  | 2 |  |  |  |  |  |
| N,N'-di,(1,1,3,3-tetramethylbutyl)melamine |  |  |  |  |  |  |  |  | 1 |  |  |  | 1 |
| N,N',N''-tri(1,1,3,3-tetramethylbutyl)melamine |  |  |  |  |  |  |  |  |  | 2 |  |  |  |
| N-methyl-N'-octadecylmelamine |  |  |  |  |  |  |  |  |  |  |  |  |  |
| N,N'-dimethyl-N''-octadecylmelamine |  |  |  |  |  |  |  |  |  |  |  | 2 |  |
| Aminoplast Resin 1 | 9 |  |  | 8 |  |  | 9 |  |  | 8 |  |  | 8 |
| Aminoplast Resin 2 |  | 8 |  |  | 9 |  |  | 8 |  |  | 9 |  |  |
| Aminoplast Resin 3 |  |  | 9 |  |  | 8 |  |  | 9 |  |  | 8 |  |
| Alkyd Resin | 20 | 20 | 20 | 20 | 20 | 20 | 20 | 20 | 20 | 20 | 20 | 20 | 20 |
| Titanium Dioxide | 25 | 25 | 25 | 25 | 25 | 25 | 25 | 25 | 25 | 25 | 25 | 25 | 25 |
| Butanol | 5 | 5 | 5 | 5 | 5 | 5 | 5 | 5 | 5 | 5 | 5 | 5 | 5 |
| Xylol | 40 | 40 | 40 | 40 | 40 | 40 | 40 | 40 | 40 | 40 | 40 | 40 | 40 |

The alkyd resin included in the above compositions consists of a blend of two parts of a glyceryl phthalate resin modified with 35 weight percent of coconut oil fatty acids and one part of a glyceryl phthalate resin modified with 40 weight percent of soybean oil fatty acids. Aminoplast Resin 1 is a commercially available butyl ether of a melamine-formaldehyde resin. Aminoplast Resin 2 is an isobutyl ether of a melamine-formaldehyde resin that is prepared by refluxing an acidic solution (pH=5.8–6.4) of 1 mol of hexamethylol melamine in 8 mols of isobutanol. Aminoplast Resin 3 is a commercially available butyl ether of a melamine-formaldehyde resin that is modified with 0.32 mol of toluene sulfonamide per mol of melamine.

Several series of steel panels are spray-coated with the above coating compositions and the films are cured by heating for, respectively, 1 hour at 180° F., 30 minutes at 225° F. and 20 minutes at 300° F. The cured films are 2 mils thick and each of the films is hard and flexible and has good gloss. The films which are cured at 300° F. are unaffected by soaking for 118 hours in an 0.5% aqueous detergent solution at 160° F.

EXAMPLE II

The following protective coating composition is prepared:

| Component: | Parts |
|---|---|
| Alkyd resin | 15.0 |
| Aminoplast resin | 14.0 |
| N,N',N''-triisopropylmelamine | 1.0 |
| Titanium dioxide | 15.0 |
| Lampblack | 0.2 |
| Xylol | 50.0 |
| Butanol | 4.8 |

The alkyd resin included in the above formulation is a glyceryl phthalate resin modified with about 42 weight percent of dehydrated castor oil fatty acids. The aminoplast resin is Aminoplast Resin 1 described in Example I. The coating composition is sprayed onto a steel panel and baked for 20 minutes at 300° F. The resulting film is very hard and has high gloss and good detergent resistance.

EXAMPLE III

An unpigmented, clear baking varnish of the following formulation is prepared:

| Component: | Parts |
| --- | --- |
| Alkyd resin | 26.00 |
| Aminoplast resin | 3.00 |
| Monomethylol N,N'-di-tert-butylmelamine | 2.00 |
| Hydrocarbon solvent | 49.00 |
| Butanol | 5.00 |
| Cobalt | 0.06 |

The alkyd resin included in the formulation is a glyceryl phthalate resin modified with about 62 weight percent of soybean oil fatty acids. The aminoplast resin is Aminoplast Resin 3 described in Example I. The hydrocarbon solvent is a commercial mixture of petroleum aliphatic hydrocarbons. The varnish is sprayed onto steel panels and baked for 20 minutes at 300° F. to provide a hard film having high gloss and good detergent resistance.

Discussion

The protective coating compositions of this invention contain as the film-forming components a ternary mixture of (1) an oil-modified alkyd resin, (2) an etherified melamine-formaldehyde resin and (3) a compound of the group consisting of (a) an N-substituted melamine of the group consisting of N,N'-dialkylmelamines, N,N',N''-trialkylmelamines and mixtures thereof, and (b) an unetherified formaldehyde condensate of such an N-substituted melamine. The oil-modified alkyd resin ordinarily will constitute 50–90 weight percent of the total of these 3 components. The N-substituted melamine or the unetherified formaldehyde condensate thereof will constitute 5–80 weight percent or preferably 5–30 weight percent of the binary mixture of said N-substituted melamine and the etherified melamine-formaldehyde resin.

The alkyd resins included in the protective coating compositions are the condensates of polyhydric alcohols such as glycols, glycerols, sorbitol, pentaerythritol, etc. with polybasic acids or anhydrides thereof, e.g., phthalic acid, phthalic anhydride, isophthalic acid, maleic acid, maleic anhydride, fumaric acid, adipic acid, azelaic acid, etc. These alkyd resins are modified with drying, semi-drying and non-drying oils such as coconut oil, castor oil, dehydrated castor oil, soybean oil, tung oil, or the acids and glycerides derived therefrom. The oil-modified alkyd resins having the best balance of properties for inclusion in the protective coating compositions of the invention contain 30–70 and preferably 30–40 weight percent of combined fatty acids. As is known, such acids will contain about 12–20 carbon atoms.

The etherified melamine-formaldehyde resins included in the protective coating compositions are known in the art. Chemically, these resins are the etherified reaction product of at least 4 mols of a monohydric alcohol containing 1–6 or preferably 3–6 carbon atoms and a condensation product of 1 mol of melamine and at least 3 mols of formaldehyde. Preferably the monohydric alcohol employed to etherify the melamine-formaldehyde condensate is a butanol such as n-butanol or isobutanol. If desired, the etherified melamine-formaldehyde resin may be modified with minor amounts of other compounds containing amino hydrogen atoms, e.g., an aryl sulfonamide.

The alkyd groups contained in the N-substituted melamines may be normal alkyl groups, e.g., a methyl group or an ethyl group, secondary alkyl groups, e.g., an isopropyl group or a secondary butyl group, or tertiary alkyl groups, e.g., a tertiary butyl group or a tertiary amyl group. As used herein, the term "alkyl group" is limited to acyclic alkyl groups and does not include within its scope cycloalkyl groups. The alkyl substituents of any given N-substituted melamine may be either identical or different. Usually the maximum number of carbon atoms contained in any individual alkyl group will be about 20 and preferably the alkyl substituents are selected so that the total number of carbon atoms contained in all of the alkyl groups does not exceed about 36. In a preferred embodiment of the invention, the N-substituted melamine employed is either an N,N',N''-tri-sec-alkylmelamine or an N,N'-di-tert-alkylmelamine. Typical N-substituted melamines which may be employed include:

N,N'-diethylmelamine
N,N'-diisopropylmelamine
N,N'-di-sec-amylmelamine
N,N'-di-sec-butylmelamine
N,N'-di-tert-butylmelamine
N,N'-di(1,1,3,3-tetramethylbutyl)melamine
N-isopropyl-N'-dodecylmelamine
N-ethyl-N'-octadecylmelamine
N,N',N''-tri-sec-amylmelamine
N,N',N''-tri-tert-amylmelamine
N,N'-dimethyl-N''-dodecylmelamine
N,N'-dimethyl-N''-dodecylmelamine
N,N'-diisopropyl-N''-2-ethylhexylmelamine The N-substituted melamines can be prepared by methods which are known in the art. For example, N,N'-dialkylmelamines can be prepared by reacting 2 mols of an appropriate alkylamine with 2,4-dichloro-6-amino-s-triazine. Similarly, N,N',N''-trialkylmelamines can be prepared by reacting 3 mols of an appropriate alkylamine with cyanuric chloride. Alternatively, the N-substituted melamines can be prepared by the method disclosed in U.S. 2,361,823. The unetherified formaldehyde condensates of the N-substituted melamines can be prepared by heating the N-substituted melamine and formaldehyde under alkaline conditions, e.g., at a pH of 8.5–10.5, in a suitable solvent such as water, a 1–6 carbon atom monohydric alcohol or a water-alcohol mixture. Such condensates may contain 1–4 mols of formaldehyde per mol of N-substituted melamine. When an N,N',N''-trialkylmelamine is employed, it will be recognized that a maximum of 3 mols of formaldehyde will react with 1 mol of the substituted melamine.

The protective coating compositions of interest ordinarily will comprise 20–70% of the ternary mixture of the film-forming components dissolved in a suitable organic solvent such as hydrocarbons, alcohols, ethers, ketones, esters, and mixtures thereof, e.g., xylol-butanol and aliphatic hydrocarbon-butanol mixtures. Pigments, driers and other conventional ingredients may be included in the coating compositions. Such compositions usually will be formulated to have a total solids content of about 40–60%.

The coating compositions of the invention may be advantageously employed to protect wooden, paper and metal surfaces. The coating compositions may be applied to the surfaces to be protected by conventional methods of application such as brushing, spraying, roll coating, dipping, etc. The films may be cured by heating for short periods of time at 180–400° F.

The above descriptions and particularly the examples are set forth by way of illustration only. Many other variations and modifications of the invention will be apparent to those skilled in the art and may be employed without departing from the spirit and scope of the invention herein described.

What is claimed is:

1. A protective coating composition comprising an organic solvent solution of a ternary mixture of (1) an oil-modified alkyd resin, (2) an etherified formaldehyde condensate of melamine and (3) a compound of the group consisting of (a) an N-substituted melamine and (b) an unetherified formaldehyde condensate of an N-substituted melamine; said oil-modified alkyd resin constituting 50–90 weight percent of the total of (1), (2) and (3); said compound (3) constituting 5–80 weight percent of the total of (2) and (3); said etherified formaldehyde condensate of melamine being an etherified reaction product of at least 4 mols of a monohydric alcohol containing 1–6 carbon atoms and a condensation product of 1 mol of melamine and at least 3 mols of formaldehyde; said N-substituted melamine being selected from the group consisting of N,N'-dialkylmelamines, N,N',N''-trialkylmelamines and mixtures thereof, the individual alkyl groups of said N-substituted melamines being acyclic and containing a maximum of about 20 carbon atoms and the total number of carbon atoms contained in all of said alkyl groups not exceeding about 36.

2. A protective coating composition of claim 1 wherein the oil-modified alkyd resin contains 30–70 weight percent of combined fatty acid moiety.

3. A protective coating composition comprising an organic solvent solution of a ternary mixture of (1) an oil-modified alkyd resin, (2) a butyl ether of a formaldehyde condensate of melamine and (3) a compound of the groups consisting of (a) an N-substituted melamine and (b) an unetherified formaldehyde condensate of an N-substituted melamine; said oil-modified alkyd constituting 50–90 weight percent of the total of (1), (2) and (3); said compound (3) constituting 5–80% of the total of (2) and (3); said butyl ether of a formaldehyde condensate of melamine being an etherified reaction product of at least 4 moles of a butanol of the group consisting of n-butanol, isobutanol and mixtures thereof and a condensation product of 1 mol of melamine and at least 3 mols of formaldehyde; said N-substituted melamine being selected from the group consisting of N,N'-dialkylmelamines, N,N',N''-trialkylmelamines and mixtures thereof, the individual alkyl groups of said N-substituted melamines being acyclic and containing a maximum of about 20 carbon atoms and the total number of carbon atoms contained in all of said alkyl groups not exceeding 36.

4. A protective coating composition of claim 3 wherein the oil-modified alkyd resin contains 30–70 weight percent of combined fatty acid moiety.

5. A protective coating composition of claim 4 wherein the N-substituted melamine included in component (3) of the composition is an N,N'-di-tert-alkylmelamine.

6. A protective coating composition of claim 4 wherein the N-substituted melamine included in component (3) of the composition is an N,N',N''-tri-sec-alkylmelamine.

7. A protective coating composition of claim 4 wherein the N-substituted melamine included in component (3) of the composition is N,N',N''-trimethylmelamine.

8. A protective coating composition of claim 4 wherein the N-substituted melamine included in component (3) of the composition is N,N',N''-tri-n-butylmelamine.

9. A protective coating composition of claim 4 wherein the N-substituted melamine included in component (3) of the composition is N,N',N''-tri-tert-butylmelamine.

10. A protective coating composition of claim 4 wherein the N-substituted melamine included in component (3) of the composition is N,N',N''-tri(1,1,3,3-tetramethylbutyl)melamine.

11. A protective coating composition of claim 4 wherein the N-substituted melamine included in component (3) of the composition is N,N'-di-tert-butylmelamine.

References Cited in the file of this patent

UNITED STATES PATENTS

| | | |
|---|---|---|
| 2,197,357 | Widmer et al. | Apr. 16, 1940 |
| 2,209,292 | Berger | July 23, 1940 |
| 2,294,590 | West | Sept. 1, 1942 |
| 2,361,823 | D'Alelio et al. | Oct. 31, 1944 |
| 2,377,867 | D'Alelio | June 12, 1945 |
| 2,454,495 | Widmer et al. | Nov. 23, 1948 |
| 2,485,059 | Mohrman et al. | Oct. 18, 1949 |
| 2,508,876 | Scott et al. | May 23, 1950 |
| 2,809,954 | Kazenas | Oct. 15, 1957 |

OTHER REFERENCES

Hodgins et al.: Melamine-Formaldehyde Film-Forming Compositions, pages 769–779, vol. 33, No. 6, Ind. & Eng. Chem. (June 1941).